Figure 1:
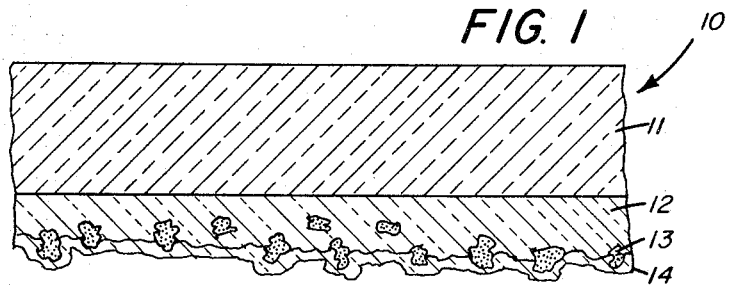
Figure 2:
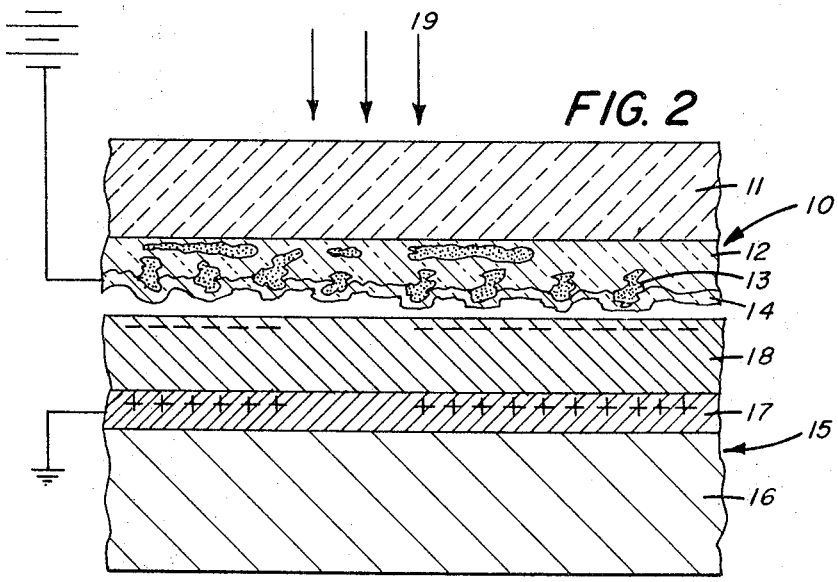

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 11, 1971

886 O.G. 215

T886,015
FLEXIBLE TRANSPARENT CONTACT CHARGING ELEMENT FOR ELECTROPHOTOGRAPHY

Richard W. Stahr and William W. Rees, both of 1669 Lake Ave., Rochester, N.Y. 14602

Filed Nov. 2, 1970, Ser. No. 85,943
**Int. Cl. G03g *13/00***
U.S. Cl. 250—49.5
1 Sheet Drawing. 13 Pages Specification

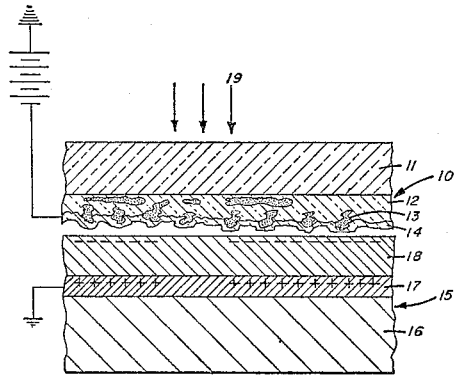

A substantially transparent, flexible element for contact charging of photoconductors is provided with a rough surface by incorporating inert granules or bead-like particles in a binder resin coated on a flexible, transparent film. Over the binder layer or imbibed into it is a semiconducting material such as cuprous iodide. The rough surface has a Sheffield Smoothness Value of from 20 to 200 and an electrical resistance of less than $10^8$ ohms/square. This rough surface controls the air gap spacing during the charging cycle when the charging film and the photoconductive element are oriented in a face-to-face mode to place a charge on the photoconductor. Such space has optimum dimensions of from 1 to 40 microns to permit gaseous ionization to occur. The element can be used for charging photoconductive elements having rough or smooth surfaces.

May 11, 1971 R. M. STAHR ETAL T886,015

FLEXIBLE TRANSPARENT CONTACT CHARGING ELEMENT
FOR ELECTROPHOTOGRAPHY
Filed Nov. 2, 1970

RICHARD W. STAHR
WILLIAM W. REES
INVENTORS

BY William H. J. Kline

ATTORNEY